(12) United States Patent
Lee et al.

(10) Patent No.: US 7,358,687 B2
(45) Date of Patent: Apr. 15, 2008

(54) METHOD FOR DRIVING BACKLIGHT UNIT

(75) Inventors: Kang Ju Lee, Gyeongsan-si (KR); Sin Kyun Park, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 235 days.

(21) Appl. No.: 11/117,392

(22) Filed: Apr. 29, 2005

(65) Prior Publication Data

US 2006/0044255 A1    Mar. 2, 2006

(30) Foreign Application Priority Data

Aug. 31, 2004   (KR)  .................... 10-2004-0069140

(51) Int. Cl.
*H05B 37/02* (2006.01)
(52) U.S. Cl. ...................... 315/291; 315/224
(58) Field of Classification Search .............. 315/224, 315/291, 307, 238, 276, 271; 345/102; 323/224
See application file for complete search history.

(56) References Cited

U.S. PATENT DOCUMENTS

| | | | |
|---|---|---|---|
| 5,942,859 A * | 8/1999 | Okude et al. ............... | 315/291 |
| 6,707,264 B2 * | 3/2004 | Lin et al. .................... | 315/307 |
| 7,200,017 B2 * | 4/2007 | Lin ............................. | 363/71 |
| 2004/0051692 A1 * | 3/2004 | Hirakata et al. ............ | 345/102 |
| 2005/0242789 A1 * | 11/2005 | Kang ......................... | 323/224 |
| 2006/0220595 A1 * | 10/2006 | Lu .............................. | 315/291 |

* cited by examiner

*Primary Examiner*—Douglas W. Owens
*Assistant Examiner*—Jimmy Vu
(74) *Attorney, Agent, or Firm*—McKenna, Long & Aldridge LLP

(57) ABSTRACT

A method for driving backlight unit includes generating at least one pulse, after generating the at least one pulse, generating a driving signal having a constant state, supplying a predetermined capacitor voltage to a lamp assembly, wherein the predetermined capacitor voltage corresponds to the at least one pulse, and supplying a second voltage to the lamp assembly supplied with the predetermined capacitor voltage, wherein the second voltage corresponds to the driving signal and wherein the lamp assembly emits light in response to the supplied second voltage.

18 Claims, 8 Drawing Sheets

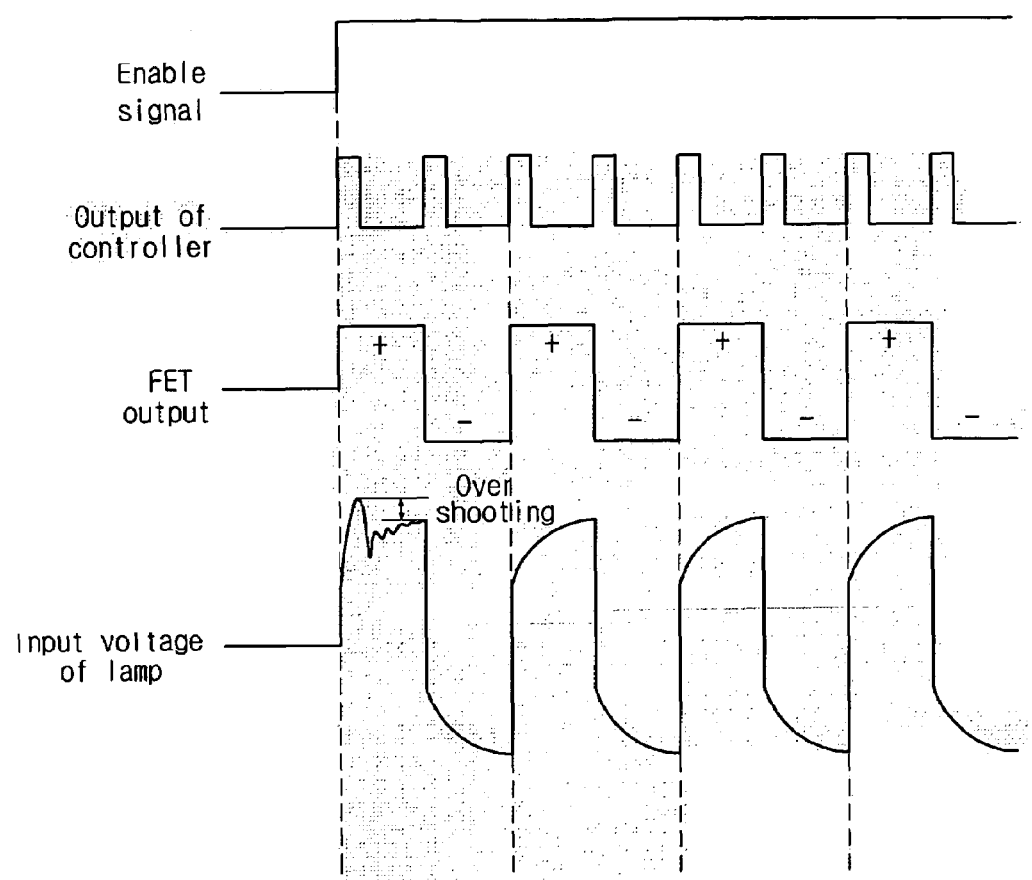

METHOD FOR DRIVING BACKLIGHT UNIT

This application claims the benefit of Korean Patent Application No. 2004-69140, filed on Aug. 31, 2004, which is hereby incorporated by reference for all purposes as if fully set forth herein.

BACKGROUND OF THE INVENTION

1. Field of the Invention

The principles of the present invention generally relate to backlight units. More particularly, the principles of the present invention relate to a method for driving a backlight unit facilitating the stable activation and/or deactivation of the backlight unit and preventing a malfunction in driving the backlight unit.

2. Discussion of the Related Art

Generally, display devices such as plasma display panels (PDPs), field emission displays (FEDs), light emitting diodes (LEDs) and liquid crystal displays (LCDs) are known as flat panel displays. Based on the manner in which they express images, flat panel displays can be classified as either light emission-type flat panel displays or light receiving-type flat panel displays. PDPs, FEDs, and LEDs are light emission-type display devices and LCDs are light receiving-type display devices. Therefore, and to express images, an LCD panel within an LCD device must receive light that is generated by an external light source. In many cases, such a light source is provided within a backlight unit.

Backlight units incorporated within LCD devices must usually have such features as a high brightness, a high operating efficiency, uniform distribution of brightness, long life span, thin profile, light weight, low price, low power consumption, and the like. Backlight units incorporated within LCD devices for notebook computers, for example, are generally required to have a low power consumption, a high efficiency, and long life span. Backlight units incorporated within LCD devices for televisions or monitors of personal computers, for example, are generally required to have a high brightness. Depending on the location of the light source with respect to the LCD panel, backlight units can be generally classified as either direct-type and edge-type.

Edge-type backlight units generally include a lamp provided along at least one lateral side of a light-guide plate that is disposed beneath an LCD panel. The light-guide plate diverts light emitted by the lamp from the lateral side to a backside of the LCD panel to uniformly transmit the emitted light into the LCD panel. Direct-type backlight units generally include a plurality of lamps provided beneath a lower surface of a light-diffusion sheet that is, in turn, disposed beneath an LCD panel.

Because many backlight units are required to emit light at a high brightness, lamps within direct- and edge-type backlight units can be provided as cold cathode fluorescent lamps (CCFLs). The CCFL includes a step-up transformer to generate the high voltage necessary to initiate and maintain discharge within the CCFL from a low AC voltage having a frequency of a few tens kHz. The low AC voltage is generated by an LC resonant inverter and has a sinusoidal waveform. While the LC resonant inverter is structurally simple and highly efficient, a plurality of CCFLs connected in parallel cannot be driven by one inverter. Accordingly, both direct- and edge-type backlight units employing multiple CCFLs undesirably require a corresponding number of inverters.

To overcome the aforementioned disadvantages of incorporating CCFLs within backlight units while satisfying the same backlight unit requirements, external electrode fluorescent lamps (EEFLs), i.e., lamps with electrodes on the outside of the lamp tube, have been developed. Backlight units incorporating EEFLs can generate light having a high brightness (i.e., a few ten thousands of $cd/m^2$) using an RF driving frequency of only a few MHz. A known direct-type backlight unit includes a plurality of EEFLs disposed on a light reflecting plate. Moreover, when connected in parallel, EEFLs can be driven using one inverter (i.e., a transformer). When driving EEFLs using connected in parallel, current flowing within respective lamps is equal to the sum of each current within the lamps. Consequently, the total current within the system can be very large. When such a large current contacts the human body, the result can be fatal. Accordingly, a limit current circuit (LCC) is used to deactivate the EEFLs when the EEFLs are in contact with the human body.

FIG. 1 illustrates a block diagram of a related art backlight unit driver. FIG. 2 illustrates waveforms associated with the related art backlight unit driver shown in FIG. 1.

Referring to FIGS. 1 and 2, an enable signal for driving a lamp assembly 17 is input to a controller 11. The enable signal can be generated within the driver or be supplied from an external source. In response to a constant high state of the enable signal (indicating that a lamp assembly 17 is to be driven), the controller 11 generates a pulse width modulated (PWM) signal and outputs the PWM signal to a FET 13, which also receives an externally input DC voltage Vin. Specifically, the FET 13 includes four transistors connected in parallel and one capacitor. Accordingly, and upon receipt of the PWM signal and the input voltage Vin, the FET 13 generates and outputs a positive DC square wave voltage every odd pulse of the PWM signal and a negative DC square wave voltage every even pulse of PWM signal. Therefore, the FET 13 alternately generates and outputs positive and negative DC square wave voltages in response to the sequential pulses of the PWM signal.

A transformer 15 boosts the output DC square wave voltage by a predetermined amount and outputs the boosted voltage to the lamp assembly 17, which includes a plurality of EEFLs connected in parallel. Accordingly, the transformer 15 outputs a boosted voltage having a substantially constant voltage during predetermined periods. Due to the parallel connection of the lamps within the lamp assembly 17, only one transformer 15 is needed to drive the lamp assembly 17.

An LCC protection circuit 19 is disposed between the transformer 15 and the lamp 17 and detects voltage and current characteristics, Vo and Io, respectively, of the transformer 15 or the lamp assembly 17. While the boosted voltage output by the transformer 15 has electrical characteristics associated with AC voltage, the boosted voltage output by the transformer 15 is rectified and converted into a DC voltage before it is provided to the LCC protection circuit 19. The manner in which the conversion is accomplished will not be discussed herein as such an operation is widely known to those in the art.

Thus, because the driver discussed above with respect to FIGS. 1 and 2 enables EEFLs to be driven according to a boosted voltage having a square waveform with a substantially constant voltage during predetermined periods, EEFLs within the lamp assembly 17 may generate light having a uniform brightness.

FIG. 3A illustrates electrical properties of a related art backlight unit driver in a normal operation mode. FIG. 3B illustrates electrical properties of a related art backlight unit driver in an abnormal operation mode.

Referring to FIG. 3A, under normal driving operations, voltage Vo and current Io, as detected by the LCC protection circuit 19, are substantially constant. However, and with reference to FIG. 3B, when either the transformer 15 or the lamp assembly 17 is contacted by an external object (e.g., the human body), the voltage Vo or the current Io can rise. If either the voltage Vo or the current Io rise too quickly, the LCC protection circuit 19 recognizes the rise as a malfunction and transmits an alarm signal to the controller 11. In response to the transmitted alarm signal, the controller 11 ceases generating the PWM signal, the transformer 15 is prevented from supplying the boosted voltage to the lamp assembly 17, and the lamp assembly 17 is deactivated.

Referring back to FIG. 2, when the lamp assembly 17 is initially driven, the transformer 15 outputs a boosted voltage having a transient overvoltage or overcurrent (i.e., effects of a naturally occurring overshooting phenomenon where the voltage suddenly varies). The magnitude of the overshooting phenomenon depends upon the output of the transformer 15 and the electrical capacity of the lamps within the lamp assembly 17. Specifically, wall charges are not charged within each lamp of the lamp assembly 17 after the boosted voltage is initially output by the transformer 15 and before the lamps produce electrical discharges to emit light. Moreover, lamps within the lamp assembly 17 have a net capacitive load before they emit light but have both capacitive and resistive loads after they emit light. The resistive component of the load produces oscillating attenuation affects. As a result, the overshooting phenomenon occurs naturally, before the lamps within the lamp assembly 17 produce electrical discharges to emit light. Therefore, as the lamps are driven over time, the overvoltage or overcurrent associated with the overshooting phenomenon is reduced and the voltage drop within each lamp decreases to a normal voltage. Moreover, the impedance of the transformer 15 cannot be adjusted to suppress the overvoltage or overcurrent.

Thus, when the transformer 15 initially generates and outputs a boosted voltage that induces the overshooting phenomenon, the boosted voltage is output to the lamp assembly 17 as well as to the LCC protection circuit 19. The LCC protection circuit 19 then erroneously registers the initially generated boosted voltage as a malfunction caused by contact with a human body and transmits an alarm signal to the controller 11, wherein the controller 11 erroneously ceases generating the PWM signal, ultimately deactivating by lamp assembly 17 by preventing the transformer 15 from outputting the boosted voltage thereto. As discussed above, however, the aforementioned overshooting phenomenon, generated upon initially driving the lamp assembly 17, is not a malfunction of the backlight unit driver. Rather, it is a naturally occurring and desirable phenomenon (i.e., each EEFL spontaneously discharges due to the overvoltage or overcurrent associated with the overshooting phenomenon and generates light having a higher brightness more efficiently).

Because the LCC protection circuit 19 of the related art backlight unit driver erroneously registers the natural overshooting phenomenon as a malfunction, the related art backlight unit driver erroneously deactivates the lamp assembly 17. Further, once the lamp assembly 17 is deactivated, the enable signal shown in FIG. 2 must be reapplied to the controller 11 to reactivate the lamp assembly 17. Accordingly, the related art backlight unit driver does drive the lamp assembly 17 in a stable manner.

SUMMARY OF THE INVENTION

Accordingly, the present invention is directed to a backlight unit driving method that substantially obviates one or more problems due to limitations and disadvantages of the related art.

An advantage of the present invention provides a method for stably driving a backlight unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a method for driving backlight unit may, for example, include generating at least one pulse; after generating the at least one pulse, generating a driving signal having a constant state; supplying a predetermined capacitor voltage to a lamp assembly, wherein the predetermined capacitor voltage corresponds to the at least one pulse; and supplying a second voltage to the lamp assembly supplied with the predetermined capacitor voltage, wherein the second voltage corresponds to the driving signal and wherein the lamp assembly emits light in response to the supplied second voltage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 illustrates voltage waveforms associated with the related art backlight unit driver shown in FIG. 1;

DETAILED DESCRIPTION OF THE ILLUSTRATED EMBODIMENTS

Reference will now be made in detail to embodiments of the present invention, examples of which are illustrated in the accompanying drawings.

Figure 1:
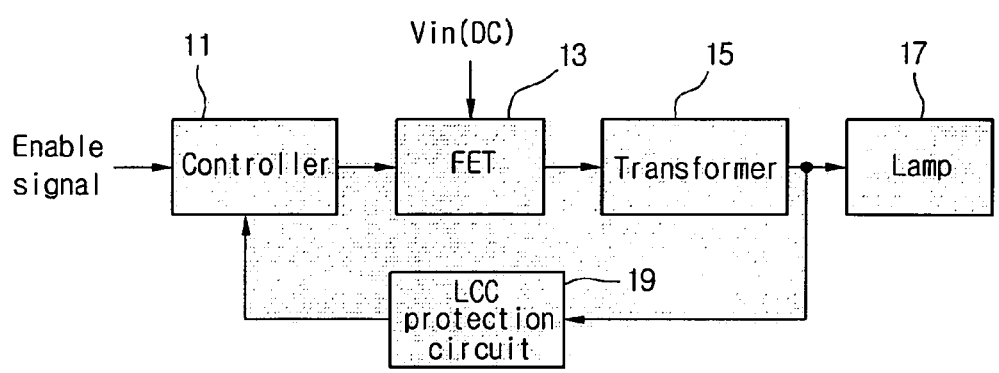
FIG. 1 illustrates a block diagram of a related art backlight unit driver.
Figure 3A:
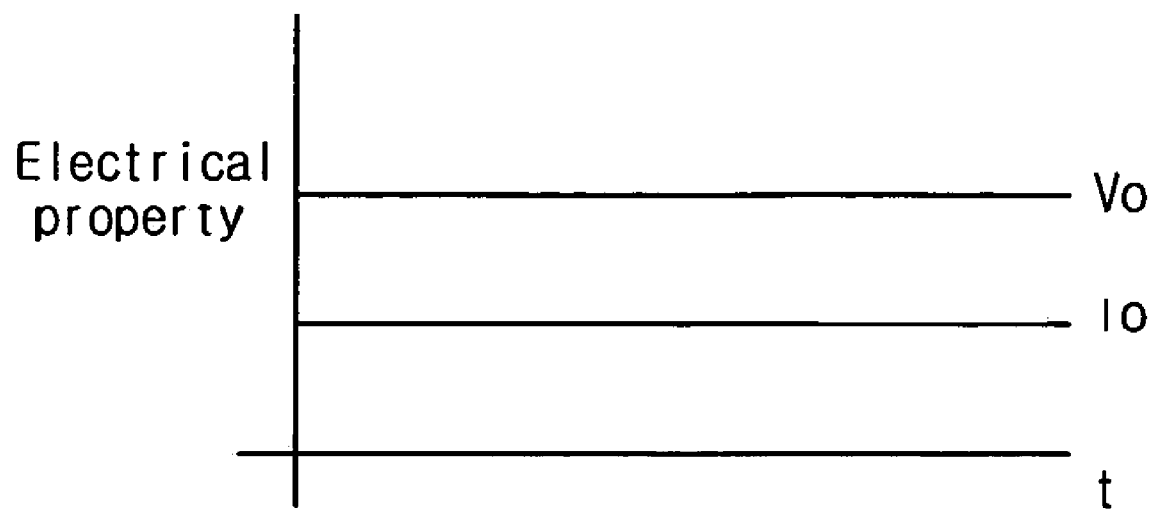
FIG. 3A illustrates electrical properties of a related art backlight unit driver in a normal operation mode.
Figure 3B:
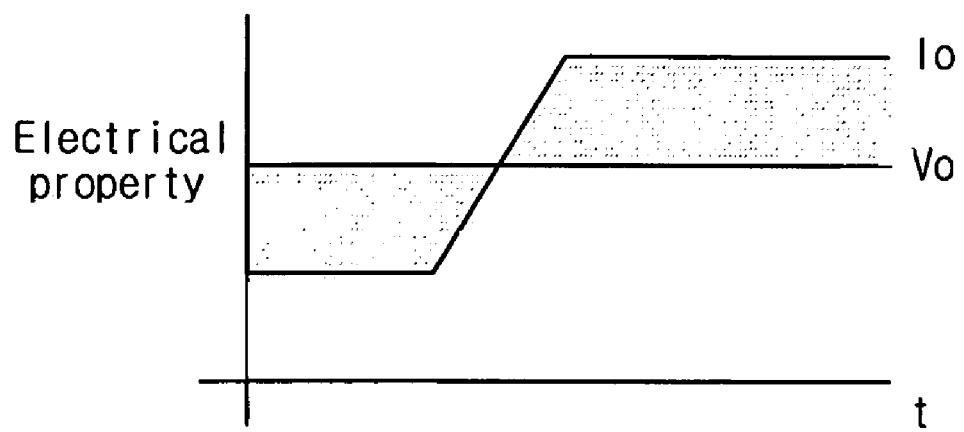
FIG. 3B illustrates electrical properties of a related art backlight unit driver in an abnormal operation mode.
Figure 4:
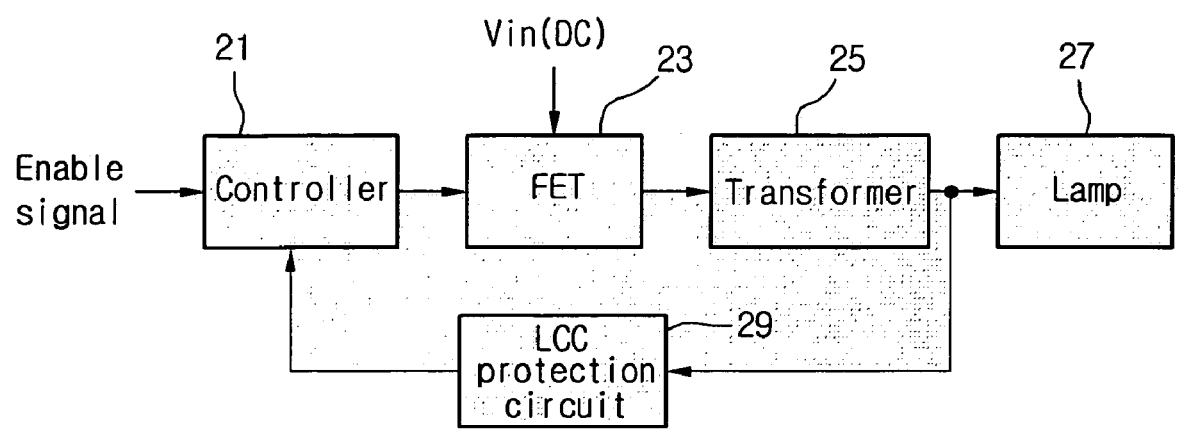
FIG. 4 illustrates a block diagram of a backlight unit driver according to principles of the present invention.

FIG. 4 illustrates a block diagram of a backlight unit driver according to principles of the present invention.

Referring to FIG. 4, a backlight-unit driver according to principles of the present invention may, for example, include a controller 21 configured to receive an enable signal as well as the output of an LCC protection circuit 29, and configured to generate and output a pulse width modulated (PWM) signal; a FET 23 configured to receive the PWM signal as well as an externally input DC voltage Vin, and configured to generate and output positive and negative DC square wave voltages associated with the PWM signal; a transformer 25 configured to receive the DC square wave voltages and to output a boosted voltage associated with the DC square wave voltages; and a lamp assembly 27 configured to receive the boosted voltage, wherein the LCC protection circuit 29 is also configured to receive the boosted voltage and output a detection signal associated with the boosted voltage. In one aspect of the present invention, the FET 23 may, for example, include four transistors connected in parallel and one capacitor. In another aspect of the present invention, the lamp assembly 27 may, for example, include a plurality of external electrode fluorescent lamps (EEFLs) connected in parallel.

Figure 5:
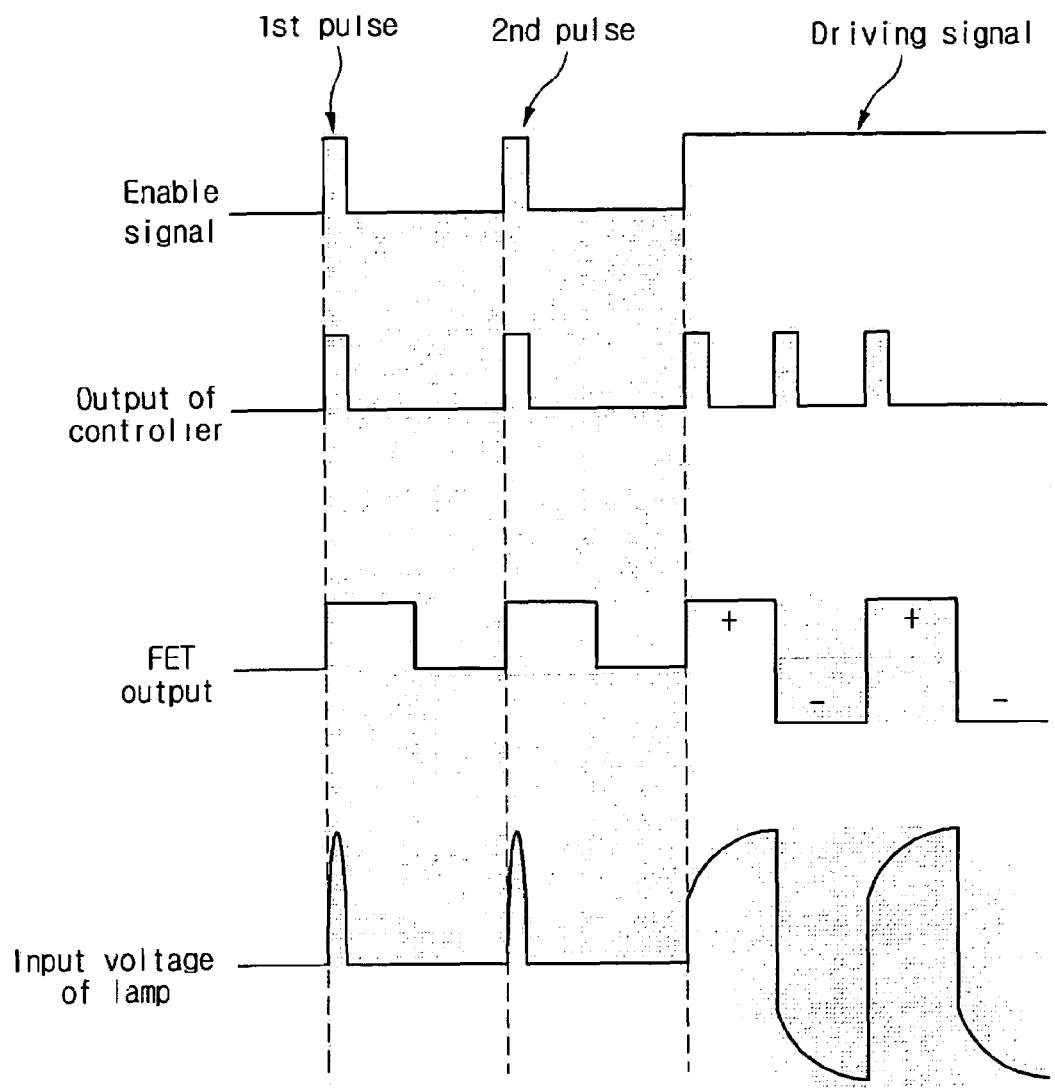
FIG. 5 illustrates an enable signal for a backlight unit driver according to principles of the present invention.

According to principles of the present invention, and with reference to FIG. 5, a predetermined enable signal may be applied to the controller 21 to prevent to the LCC protection circuit 29 from erroneously registering a naturally occurring overshooting phenomenon as a malfunction caused, for example, by contact with an external object (e.g., a human body). In one aspect of the present invention, the enable signal may, for example, include at least one pulse (e.g., a first pulse and a second pulse) followed by a constant state signal (e.g., a high state signal) indicating that the lamp assembly 27 is to be driven. Such a constant state signal will herein be referred to as a driving signal.

In one aspect of the present invention, the enable signal exemplarily illustrated in FIG. 5 may, for example, be generated within the backlight unit driver illustrated in FIG. 4 or may be supplied from an external source. In response to the first pulse of the enable signal, the controller may generate, for example, a PWM signal corresponding to the period of the first pulse and output the PWM signal to the FET 23. In response to the PWM signal, the FET 23 may generate, for example, a DC square wave voltage and output the DC square wave voltage to the transformer 25 which, in turn, may boost the DC square wave voltage and outputs a first boosted voltage to the lamp assembly 27. Because the first boosted voltage is generated in accordance with the first pulse, the first boosted voltage may be a single square wave voltage having a very short period.

Figure 6A:
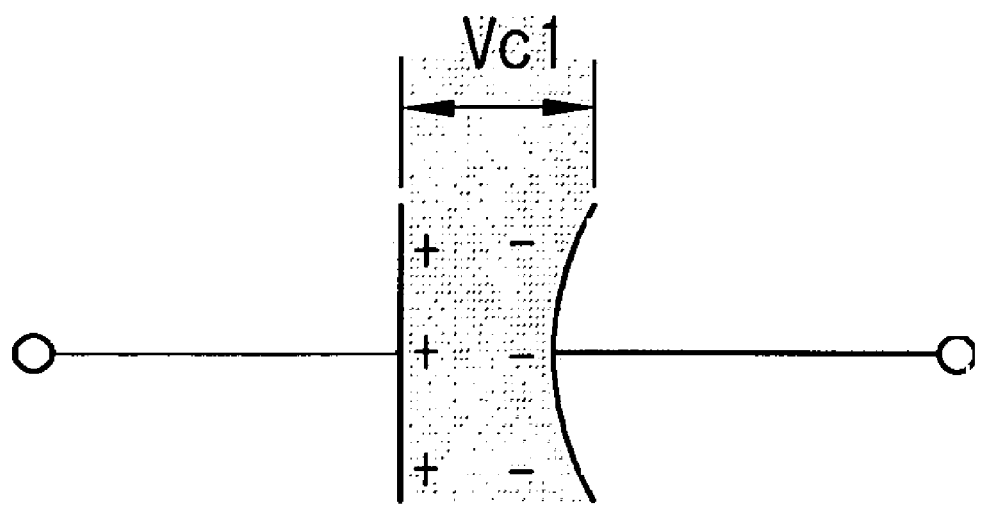
FIGS. 6A and 6B illustrate electrical characteristics of a voltage output by the transformer shown in FIG. 5.
Figure 6B:
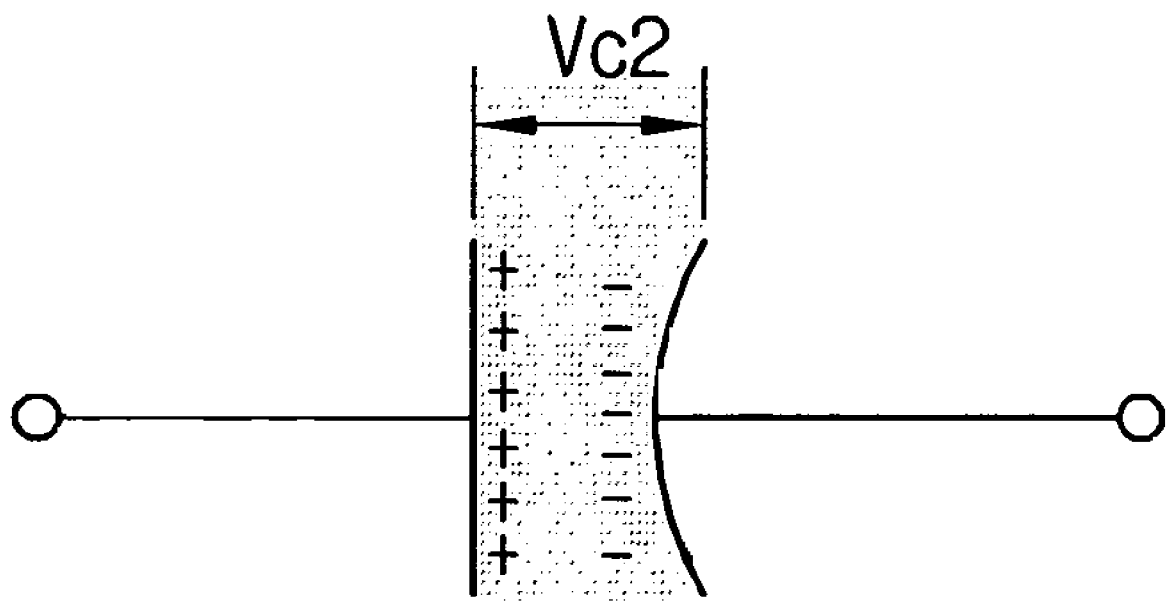

As discussed above, individual lamps within the lamp assembly 27 exhibit a net capacitive load before they produce electrical discharges to emit light. Accordingly, the first boosted voltage applied to the lamp assembly 27 does not provide a sufficient electrical charge within each lamp to initiate the electrical discharges that cause light emission. Thus, and as shown in FIG. 6A, a low capacitor voltage "Vc1" is charged within each lamp upon applying the first boosted voltage according to the first pulse of the enabling signal. Similarly, when the second pulse of the enable signal is applied to the controller 21, the transformer 25 generates another first boosted voltage and outputs the first boosted voltage to the lamp 17. Accordingly, the reapplied first boosted voltage provides an additional electrical charge within each lamp of the lamp assembly 27. Thus, and as shown in FIG. 6B, a high capacitor voltage "Vc2" is charged within each lamp upon reapplying the first boosted voltage according to the second pulse of the enabling signal.

After applying the first boosted voltages corresponding to the first and second pulses of the enabling signal, the driving signal may be applied to the controller 21. In response to the driving signal of the enable signal, the controller may generate a PWM signal corresponding to the driving signal and output the PWM signal to the FET 23. Accordingly, and upon receipt of the PWM signal and the voltage Vin, the FET 23 may generate and output a positive DC square wave voltage every odd pulse of the PWM signal and a negative DC square wave voltage every even pulse of PWM signal. Thus, the FET 23 may alternately generate and output positive and negative DC square wave voltages in response to the sequential pulses of the PWM signal. The transformer 25 may then boost each DC square wave voltage and output each boosted voltage to the lamp assembly 27 as a second boosted voltage that corresponds to the driving signal. The second boosted voltage is then applied to the lamp assembly 27 and causes the lamps within the lamp assembly 27 to emit light.

According to principles of the present invention, the second boosted voltage that is initially output by the transformer 25 may induce an overshooting phenomenon. However, the overvoltage and overcurrent associated with the overshooting phenomenon may be significantly reduced due to the presence of the high capacitor voltage Vc2 charged within the lamps of the lamp assembly 27. As a result, when the second boosted voltage is initially generated, it is output to the lamp assembly 27 at a normal voltage and a normal current.

As discussed above with respect to the related art, when boosted voltages corresponding to driving signals are initially generated, they can induce a naturally occurring overshooting phenomenon that, when detected by LCC protection circuits, can lead to erroneous and intermittent deactivation of the backlight unit driver and lamp assembly. However, because the principles of the present invention enable a high capacitor voltage Vc2 to be charged within lamps of the lamp assembly 27 via the first boosted voltages corresponding to the first and second pulses, the initially generated second boosted voltage corresponding to the driving signal it is output to the LCC protection circuit 29 at a normal voltage and a normal current. Accordingly, the LCC protection circuit 29 may be prevented from erroneously registering the effects of a naturally occurring overshooting phenomenon as a malfunction caused by contact with an external object (e.g., a human body) when the second boosted voltage corresponding the driving signal is initially generated. As a result, the LCC protection circuit 29 may be prevented from erroneously transmitting an alarm signal to the controller 21 to interrupt the driving of the lamp assembly 27.

According to principles of the present invention, the width and/or number of pulses such as the aforementioned first and second pulses may be adjusted according to characteristics of the lamps within the lamp assembly 27. For example, as the width of pulses increases, the number of such pulses applied to the controller 21 decreases (e.g., to one pulse) from which a boosted voltage can sufficiently charge the capacitors within the lamp assembly 27 to suppress the overvoltage upon driving the lamp assembly 27. As the width of pulses decreases, the number of such pulses applied to the controller 21 increases (e.g., to many pulses) from which boosted voltages can sufficiently charge the capacitors within the lamp assembly 27 to suppress the overvoltage upon driving the lamp assembly 27. In another aspect of the present invention, the width and/or number of pulses such as the aforementioned first and second pulses may, for example, be programmed by software when, for example, PWM signals are output from the controller 21 to the FET 23. In yet another aspect of the present invention, the width and/or number of pulses may be adjusted to allow the lamp assembly 27 to be stably activated and deactivated.

As described above, the principles of the present invention can prevent the LCC protection circuit 29 from erroneously transmitting an alarm signal to the controller 21 upon initially driving the lamp assembly 27 according to a driving signal by supplying a predetermined voltage to the lamp assembly before it is driven.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for driving a backlight unit, comprising:
   generating at least one pulse;
   after generating the at least one pulse, generating a driving signal having a constant state;
   supplying a predetermined capacitor voltage to a lamp assembly, wherein the predetermined capacitor voltage corresponds to the at least one pulse; and
   supplying a second voltage to the lamp assembly supplied with the predetermined capacitor voltage, wherein the second voltage corresponds to the driving signal and wherein the lamp assembly emits light in response to the supplied second voltage,
   wherein the at least one pulse and the driving signal are included within an enable signal.

2. The method according to claim 1, further comprising generating a plurality of pulses.

3. The method according to claim 2, wherein the number of pulses within the plurality of pulses corresponds to the width of the plurality of pulses.

4. The method according to claim 1, wherein supplying the predetermined capacitor voltage includes supplying at least one first voltage to the lamp assembly.

5. The method according to claim 4, wherein a period of the at least one first voltage corresponds to a width of the at least one pulse.

6. The method according to claim 4, wherein the at least one first driving voltage has a substantially square waveform.

7. The method according to claim 1, wherein the second voltage includes at least one positive square wave voltage and at least one negative voltage having a substantially square waveform.

8. The method according to claim 1, wherein the second voltage includes a plurality of positive and negative voltages having a substantially square waveform.

9. The method according to claim 1, wherein the number of pulses generated corresponds to the magnitude of an overshooting phenomenon that is generated upon initially supplying the second voltage.

10. The method according to claim 9, wherein the predetermined capacitor voltage corresponds to the amount of an overvoltage that is decreased to a normal voltage, wherein the overvoltage is generated upon initially supplying the second voltage.

11. The method according to claim 9, wherein the predetermined capacitor voltage corresponds to the amount of an overcurrent that is decreased to a normal current, wherein the overcurrent is generated upon initially supplying the second voltage.

12. The method according to claim 1, wherein the lamp assembly includes a plurality of lamps connected in parallel.

13. A method of driving a backlight unit, comprising:
    supplying an electrical charge to at least one lamp within a lamp assembly, wherein the supplied electrical charge is insufficient to cause the at least one lamp to emit light;
    after a predetermined amount of time subsequent to supplying the electrical charge, supplying a driving voltage to the at least one lamp to cause the at least one lamp to emit light, and
    generating an enable signal including at least one pulse and a driving signal following the at least one pulse, wherein the electrical charge supplied corresponds to the at least one pulse and the supplied driving voltage corresponds to the driving signal.

14. The method according to claim 13, wherein supplying the electrical charge includes charging at least one capacitor voltage within the at least one lamp.

15. The method according to claim 13, wherein supplying the electrical charge includes sequentially charging at least two capacitor voltages within the at least one lamp.

16. The method according to claim 13, wherein the at least one pulse includes a plurality of pulses.

17. The method according to claim 13, further comprising:
    generating DC square wave voltages corresponding to the enable signal;
    boosting each square wave voltage; and
    applying the boosted voltages as the at least one capacitor voltage and the driving voltage.

18. A method of driving a backlight unit, comprising:
    generating an enable signal including at least one pulse and a driving signal having a constant state following the at least one pulse;
    supplying a predetermined capacitor voltage to a lamp assembly, wherein the predetermined capacitor voltage corresponds to the at least one pulse;
    generating a pulse width modulated (PWM) signal corresponding to the enable signal;
    receiving an input DC voltage;
    generating a DC square wave voltage corresponding to the PWM signal and the input DC voltage;
    boosting the DC square wave voltage; and
    applying the boosted voltage to a lamp assembly, wherein the lamp assembly includes a plurality of external electrode fluorescent lamps (EEFLs) connected in parallel.

* * * * *